United States Patent [19]
Burnett

[11] 3,768,602
[45] Oct. 30, 1973

[54] APPLICATION ADJUSTER FOR AIR-ACTUATED DISC BRAKE

[75] Inventor: Richard T. Burnett, South Bend, Ind.

[73] Assignee: The Bendix Corporation, South Bend, Ind.

[22] Filed: Apr. 13, 1972

[21] Appl. No.: 243,794

[52] U.S. Cl............................. 188/71.9, 188/196 F
[51] Int. Cl............................................. F16d 65/56
[58] Field of Search .................. 188/71.9, 79.5 GE, 188/196 F, 196 BA

[56] References Cited
UNITED STATES PATENTS
3,590,964  7/1971  Krause......................... 188/71.9 X Primary Examiner—Duane A. Reger
Attorney—Ken C. Decker et al.

[57] ABSTRACT

A mechanically actuated disc brake is disclosed which includes the usual caliper slidably mounted on a torque member. The caliper exerts braking pressure on a pair of friction elements to drive the latter into frictional engagement with the disc or rotor. The brake is actuated by rotation of a lever mounted within the caliper to drive spherical force transmitting elements up ramps which are provided in the lever and in the wall of the caliper to urge the lever axially within the caliper. Axial movement of the lever is transmitted to one of the friction elements through an extendible member comprising the usual piston which is threadedly connected to an adjusting screw, which extends from the piston upon relative rotation between the screw and the latter. A one-way clutch spring interconnects the lever and the adjusting screw so that, after predeterined arcuate movement of the lever, further rotation of the lever rotates the screw with respect to the piston, causing the screw to extend from the latter to thereby maintain the retraction of the friction elements to a predetermined substantially constant amount. The clutch spring grippingly interconnects the lever and the adjuster screw until a predetermined torque is applied to the clutch spring, whereupon the clutch spring slips relative to the screw to prevent rotation of the latter when the actuating force exceeds the predetermined level. Therefore, the adjuster is inherently self-compensating, thereby preventing over-adjustment in the brake when usually large actuating forces are applied to the latter.

11 Claims, 2 Drawing Figures

PATENTED OCT 30 1973 3,768,602

APPLICATION ADJUSTER FOR AIR-ACTUATED DISC BRAKE

BACKGROUND OF THE INVENTION

This invention relates to an automatic adjuster for a mechanically actuated disc brake.

Fluid-actuated disc brakes have become increasingly popular for use on passenger cars within the past few years. While disc brakes possess many advantages over the drum brakes in the prior art, they have not been widely used on commercial vehicles. For the most part, disc brakes have not been accepted by users of heavy commercial vehicles, probably because prior art disc brakes have been almost exclusively actuated by hydraulic pressure. On the other hand, most large commercial vehicles are provided with an air brake actuating system. Therefore, it is desirable to provide a disc brake which may be actuated by air pressure. Such a brake is disclosed in copending U.S. Patent Application Ser. No. 156,746, filed June 28, 1971, abandoned, owned by the assignee of the present invention and incorporated herein by reference. The above-referenced application discloses a disc brake which includes a mechanical actuator and an external air chamber for actuating the mechanical actuator when a brake application is effected. Since most mechanical actuators for disc brakes have a very limited applying stroke, it is imperative that an automatic adjuster be provided to maintain the proper clearance between the friction elements of the brake and the friction faces of the rotor. An adjusting mechanism suitable for use in a brake of this type which effects adjustment during the release stroke of the actuator is disclosed in U.S. Patent Application Ser. No. 156,646, filed June 25, 1971, owned by the assignee of the present invention and incorporated herein by reference. However, automatic adjusters which effected adjustment on the application stroke of the actuator possesses many advantages over release adjusters and, in certain applications, may be the only practical solution to the problem. Furthermore, it is desirable to limit operation of the adjuster to an actuating force below a predetermined maximum, since if adjustment is effected during a very hard brake application, such as might occur during a so-called "panic stop," the elastic deformation of the caliper may result in over-adjustment of the brake, thereby causing premature wear of the friction elements.

SUMMARY OF THE INVENTION

Therefore, an important object of my invention is to provide an automatic adjuster for a mechanically actuated disc brake.

Another important object of my invention is to provide a simple automatic adjuster for a disc brake thereby permitting its manufacture at a minimum cost.

A further object of my invention is to provide an automatic adjuster that effects an adjustment during the application stroke of a mechanical actuator.

A still further object of my invention is to provide an automatic adjuster which limits adjustment to a predetermined maximum actuating force.

DETAILED DESCRIPTION

Figure 1:
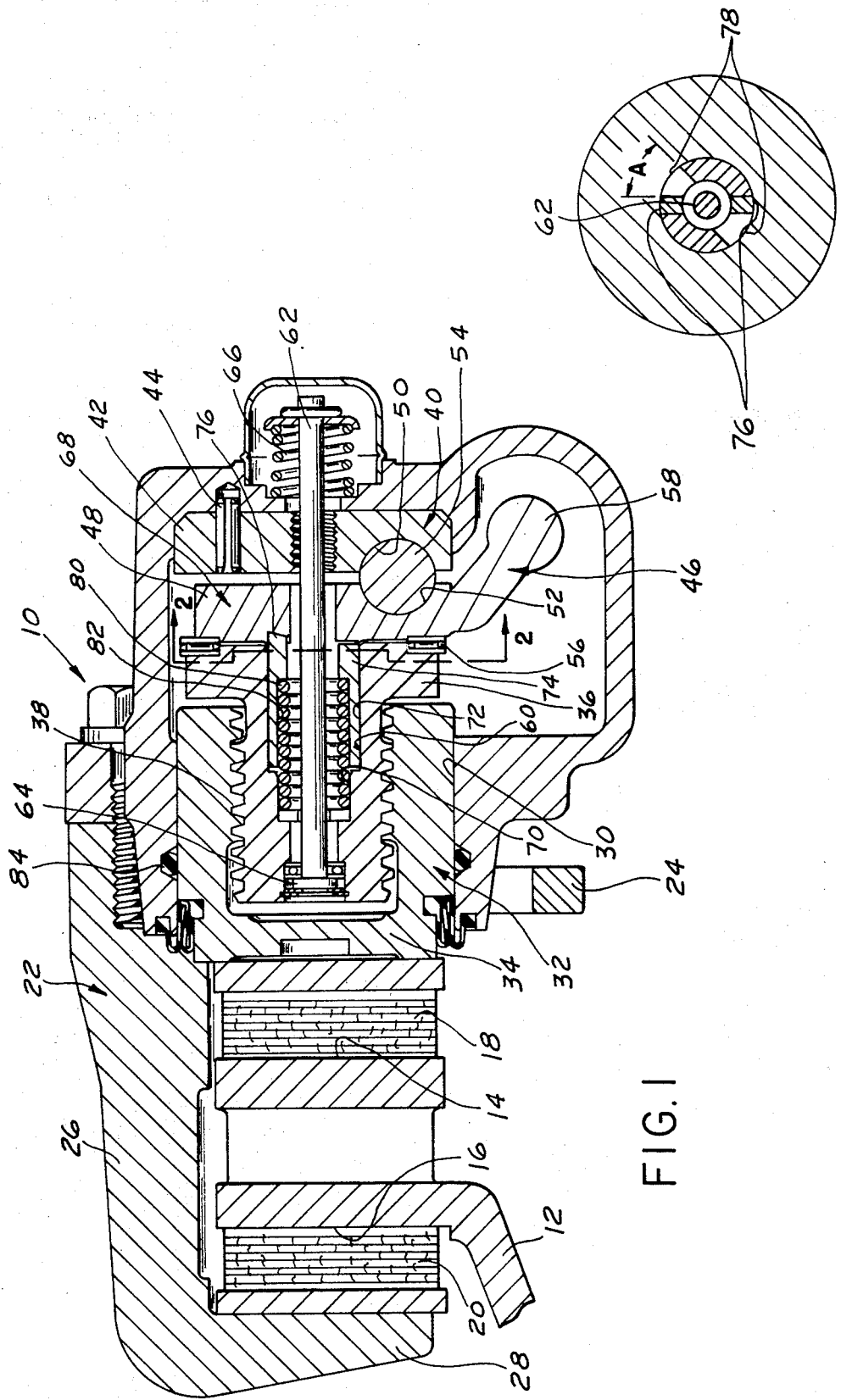
FIG. 1 is a cross-sectional view of a disc brake made pursuant to the teachings of my present invention.

Referring now to the drawings, the disc brake generally indicated by the numeral 10 includes a rotor 12 having a pair of friction faces 14 and 16. A pair of friction members 18, 20 are disposed adjacent each of the friction faces 14, 16, respectively. A caliper 22 is slidably mounted on a torque member 24 by any suitable means, such as that disclosed in my U.S. Pat. No. 3,388,774, owned by the assignee of the present invention and incorporated herein by reference. The torque member 24 is mounted on a non-rotatable part of the vehicle, such as an axle flange, to mount the caliper 22 adjacent the friction member 18. Caliper 22 includes a bridge portion 26 which extends across the periphery of the rotor 12 and an inwardly extending portion 28 disposed adjacent the friction member 20.

The caliper 22 defines a bore 30 therewithin in which an annular piston 32 reciprocates. The piston 32 has a closed end 34 which is adapted to engage the friction member 18 to urge the latter against the friction face 14. The piston 32 receives an adjusting screw 36 therewithin, and the inner circumferential surface of the piston 32 and the outer circumferential surface of the screw 36 are provided with threads 38 which cooperate with one another in such a manner that upon relative rotation between the piston 32 and the screw 36 in one direction the nut extends from the piston 32. Therefore, the piston 32 and the screw 36 define an extendible member through which the brake actuating force is transmitted. It should be noted that the frictional torque of the threads 38 which resists rotation of the screw 36 with respect to the piston 32 is directly proportional to the brake actuating force which acts through the screw 36 and the piston 32 in a generally axial direction as will be hereinafter explained.

The brake 10 is actuated by an actuating mechanism generally indicated by the numeral 40. Mechanism 40 includes a first camming plate 42 which is secured to the caliper 22 by a pin 44. A lever generally indicated by the numeral 46 which includes a second camming plate 48 which is rotatably mounted within the caliper housing 22 adjacent the camming plate 42. Complementary recesses 50, 52 are provided in the cam plates 42 and 48, respectively. Although one set of recesses 50, 52 are illustrated in FIG. 1, it will be understood that a plurality of recessed pairs are provided spaced circumferentially about the cam plates 42, 48 as disclosed in the aforementioned Application Ser. No. 156,746. Force transmitting elements or spheres 54 are disposed in each of the recessed pairs 50, 52 and are adapted to be urged up a ramp on the recess upon relative rotation of the cam plate 48 with respect to the cam member 42 so that a force is generated urging the cam plate 48 axially within the caliper 22 to the left viewing FIG. 1. A bearing 56 is disposed between the cam plate 48 and the adjuster screw 36 to permit relative rotation therebetween. The outer end 58 of the lever 46 is connected to any appropriate actuating mechanism, but is preferably connected to a fluid pressure actuator of the type disclosed in co-pending U.S. Patent Application Ser. No. 238,547 filed March 27, 1972, owned by the assignee of the present invention and incorporated herein by reference.

A second bore generally indicated by the number 60 is defined within the adjuster screw 36. A pin 62 extends through the bore 60 and also extends through the cam plate 48, 42, and through the wall of the housing 22. One end of the pin 62 is provided with a head 64 which engages the end of the adjustor nut 36, and a spring 66 engages the other end of the pin 62 to yieldable urge the latter to the right viewing FIG. 1. A bearing 65 is disposed between the head 64 of pin 62 and the screw 36. Therefore, the piston 32 is yieldably urged away from the rotor 12. Since the pin 62 also extends through the cam plate 48 and 42, the end of the adjustor screw 36 is urged against the cam plate 48 and the latter is urged toward the cam plate 42 thereby maintaining the integrity of the actuating mechanism 40. The ramps of the recesses 50 and 52 are so designed that a restoring force of the spring 66 which urges the cam plate 48 in an axial direction urges the spheres 54 back into the recesses 50, 52, thereby returning the lever 46 to the brake-release position after movement of the latter in a rotary direction to the brake-actuated position by the aforementioned fluid pressure actuator (not shown).

Adjustment of the brake 10 to compensate for wear of the friction elements 18, 20 is accomplished by mechanism generally indicated by the numeral 68. Bore 60 is stepped to define smaller and larger diameter sections 70, 72, respectively. A clutch sleeve 74 is slidably received within the section 72 of the bore 60. Keys 76 extend from the end of the sleeve 74 adjacent to the cam plate 48 and projects into arcuate slots 78 provided in the latter. The arcuate slots 78 extends through an angle A, plus the width of the key, and it will be recognized by those skilled in the art that if the cam plate 48 is rotated through an angle equal to angle A or less, the sleeve 74 will be unaffected. However, if the lever 46 is rotated through an angle greater than the angle A, the key 76 will engage the end of the slot 78, so that the sleeve 74 will rotate with the lever 46. A one-way clutch spring 80 is disposed within the bore 60 and interconnects the clutch 74 and the adjustor screw 36. It will be noted that the diameter of the bore 82 defined within the sleeve 74 is greater than the diameter of the section 70 of the bore 60. However, the nominal diameter of the coils of the spring 80 are greater than the diameter 82 or the diameter 70, so that when the spring 80 is stalled in the position illustrated in FIG. 1 the coils of the spring frictionally engage the bore 70 and the bore 82. However, since the diameter 82 is larger than the diameter 70, the frictional force exerted by the coils of the spring 80 within the bore 82 is less than the frictional force exerted by the coils disposed within the section 70 of bore 60.

It will be noted that a greater number of coils of the spring 80 are disposed within the bore 82 and a lesser number of coils are disposed within the bore 70. Since the frictional torques between the coils of the spring in the wall of the bores is proportional to the number of coils within the bore in addition to the bore diameter, rotation of spring 80 in the one direction will transmit a torque to screw 36 sufficient to turn the latter relative to piston 32 to produce adjustment, while permitting the spring 80 to slip relative to bore 70 when the torque acting on the screw 36 resisting rotation becomes excessively large. Rotation of the piston 32 is resisted by an annular seal 84 and by a frictional engagement of the friction element 18 with its corresponding friction face 14.

MODE OF OPERATION

Figure 2:
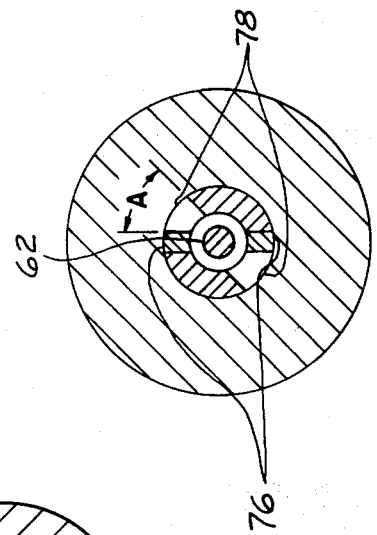
FIG. 2 is a cross-sectional view taken substantially along line 2—2 of FIG. 1.

When a brake application is effected, the aforementioned actuator (not shown) rotates the cam plate 48 in a counterclockwise direction viewing FIG. 2. Rotation of the cam plate 48 moves the recess 52 out of alignment with the recess 50, and thereby urges the sphere 54 up the ramps of the recesses 50 and 52, thereby generating a force driving the lever 46 toward the rotor 12 along the axis of the caliper bore. The force generated by axial movement of the lever 46 is transmitted to the friction element 18 through the adjustor screw 36 and the piston 32, to thereby drive the friction member 18 into frictional engagement with the friction face 14. Because the caliper 22 is slidably mounted on the torque member 24, reaction forces acting through the bridge portion 26 and inwardly extending portion 28, also urge the friction member into engagement with the friction face 16, thereby effecting a brake application.

It will be noted that, as long as the angle of rotation of the cam plate 48 required to effect a brake application is less than the angle A, the slot 78 will move relative to the key 76 and therefore the sleeve 74 will be unaffected, and therefore, no brake adjustment occurs. However, if the angle of rotation required is greater than the angle A thereby requiring a brake adjustment, the key 76 engages the end of the slot 78 so that additional rotation of the lever 46 will also rotate the sleeve 74 in a counterclockwise direction. Because of the frictional engagement of the spring 80 with the sleeve 74 and with the adjuster screw 36, rotation of the sleeve 74 generates a frictional torque tending to rotate the adjustor screw 36. Rotation of the adjustor screw 36 in the counterclockwise direction by the lever 46 extends the latter from the piston 32 thereby lengthening the extendible member defined by the screw 36 and piston 32 to compensate for the wear of the friction elements 18. It will also be noted that the force of friction acting on the outer diameter of the screw 36 due to the engagement of the threads 38 must be less than the torque due to the force of frictional engagement of the spring 80 with the bore 70. Since the frictional torque generated between the threads 38 is directly proportional to the axial force transmitted through the piston 32 and adjustor screw 36, as long as the actuating forces are relatively low, the frictional torque acting on the outer diameter of the screw 36 will also be relatively low, thereby permitting the latter to rotate upon rotation of the sleeve 74 to effect a brake adjustment. However, if a relatively high actuating force is generated, such as would occur in a so-called "panic stop," the axial force transmitted through the adjustor screw 36 and piston 32 is quite large, thereby generating a frictional torque on the outer diameter of the screw 36 which exceeds the frictional torque generated by the engagement of the spring 80 with the wall of the bore 70. If this occurs, the spring 80 slips relative to the screw 36, thereby precluding adjustment when the actuating forces applied to the lever 46 exceed a predetermined level.

When the brake is released, the force on the lever 46 is relieved. The spring 66 yieldably urges the piston 32 and the screw 36 away from the rotor 12, in the brake release direction. Simultaneously, a force urging cam plate 48 to the right is generated and because of the design of the ramps of the recesses 50 and 52, the spheres 54 are permitted to drop back into the recesses 50 and 52, thereby permitting the cam plate 48 to be returned to the brake-released position. If the screw 36 was rotated during the preceding brake actuation, the sleeve 74 is rotated in a clockwise direction in an amount equal to the angle that the spring 80 was rotated. However, the spring 80 is constructed in such a way that the outer diameter of the coils of the latter grows a small amount when the spring is rotated in one direction, and "shrinks" a similar amount when the spring is rotated in the opposite direction. Therefore, when the sleeve 74 is rotated in the actuating direction the spring 80 "grows" to frictionally engage the sleeve 74, but when the latter is moved in the brake-released or return direction, the diameter of the spring 80 shrinks a slight amount to permit the sleeve 74 to slip relative to the coils of the spring 80 during release of the brake. Since the frictional torque generated between the coils of the spring 80 and the walls of the bores 70 and 82 is proportional to the number of coils engaging the walls of the respective bores, and since a greater number of coils engage the wall of bore 82 and a lesser number of coils engage the wall of bore 70, upon release of the brake the spring 80 slips relative to the bore 70 while turning with the sleeve 74 upon release of the brake.

I claim:

1. In a brake:
a rotor having a pair of friction faces;
a pair of friction members, one of said friction members being disposed adjacent each of said friction faces;
a torque member;
a caliper slidably mounted on said torque member and operably connected to each of said friction members for urging said friction members into engagement with their corresponding friction faces when a brake application is effected;
said caliper including a housing defining a chamber therewithin; and
actuating means within said chamber for urging said friction members toward their corresponding friction faces;
said actuating means including an extendible member slidable in said chamber and operably connected to one of said friction elements, said extendible member having a pair of relatively rotatable elements and extending upon relative rotation between said elements, cam means rotatably mounted in said bore for sliding said extendible member upon rotation of said cam means, and clutch means for coupling said cam means to one of said elements upon actuation of the brake and for uncoupling said cam means to permit the latter to rotate relative to said one element upon release of the brake, said clutch means including first means for permitting said cam means to initially rotate relative to said one element for a predetermined arc upon actuation of the brake and second means for coupling said one element to said cam means for rotation therewith after said cam means is rotated through said predetermined arc.

2 The invention of claim 1:
said clutch means being responsive to the torque resisting rotation of said one element by the engagement of the latter with the other element to permit the cam means to rotate relative to said one element when said cam means is rotated past said predetermined arc when the torque resisting rotation of said one element exceeds a predetermined amount.

3. The invention of claim 2:
means interconnecting said relatively rotatable elements in such a manner that said torque resisting rotation of said one element is proportional to the actuating force exerted through said elements from said cam means to the friction members.

4. The invention of claim 3:
said last-mentioned means being threads interconnecting said elements.

5. The invention of claim 2:
said cam means including a lever rotatably mounted in said chamber and rotating in an actuation direction when a brake application is effected and in a return direction when the brake is released;
said clutch means including resilient means operatively connected to said lever and to said one element, said lever rotating relative to said resilient means for said predetermined arc and thereafter rotating said resilient means to rotate said one element, said lever rotating relative to said resilient means in said return direction.

6. The invention of claim 5:
said resilient means exerting a predetermined coupling torque on said one element to couple the latter to the lever when the resilient means is rotated by the latter;
said resilient means rotating relative to said one element to prevent rotation of the latter when the torque exerted by the other element resisting rotation of the one element exceeds the coupling torque exerted on said one element by said spring.

7. The invention of claim 2:
said one element defining a bore therewithin;
a sleeve rotatable in said bore and extending axially into the latter a distance less than the length of said bore, said sleeve operably connected to said lever;
said resilient means being a coiled spring compressed radially in said bore and extending axially into said sleeve so that the outer circumferential surfaces of the coils of the spring frictionally engage the wall of the bore and the inner circumferential surface of said sleeve.

8. The invention of claim 7; and
means interconnecting said relatively rotatable elements in such a manner that said torque resisting rotation of said one element by the engagement of the latter with the other element is proportional to the actuating force exerted through said elements from said lever to the friction members;
said coiled spring slipping relative to said bore when the torque exerted on said one element by the other element exceeds the torque due to frictional engagement of said coiled spring with the wall of said bore.

9. The invention of claim 8:
the diameter of the inner circumferential surface of said sleeve being greater than the diameter of said bore, whereby the frictional force between the coils of said coiled spring and the wall of the bore is greater than the frictional force between the coils of said coiled spring and the inner circumferential surface of said sleeve.

10. The invention of claim 7:
said first means including an arcuate slot in said cam means, said second means including a key extending from said sleeve and received within said slot.

11. The invention of claim 1:
said first means including an arcuate slot in said camming means, said second means including a key operably connected to said one element, said key being slidably received within said slot.

* * * * *